(12) United States Patent
Gohier

(10) Patent No.: US 11,389,976 B2
(45) Date of Patent: Jul. 19, 2022

(54) DISPOSABLE ISOLATOR AND PRODUCT CONDITIONING INSTALLATION COMPRISING SUCH A DISPOSABLE ISOLATOR

(71) Applicant: JCE BIOTECHNOLOGY, Hauterive (FR)

(72) Inventor: Eric Gohier, Vichy (FR)

(73) Assignee: JCE BIOTECHNOLOGY, Hauterive (FR)

( * ) Notice: Subject to any disclaimer, the term of this patent is extended or adjusted under 35 U.S.C. 154(b) by 277 days.

(21) Appl. No.: 16/856,660

(22) Filed: Apr. 23, 2020

(65) Prior Publication Data

US 2020/0338765 A1   Oct. 29, 2020

(30) Foreign Application Priority Data

Apr. 26, 2019 (FR) ...................................... 1904444

(51) Int. Cl.
*B25J 21/00* (2006.01)
*B65B 3/04* (2006.01)
(Continued)

(52) U.S. Cl.
CPC .............. *B25J 21/005* (2013.01); *B01L 1/02* (2013.01); *B25J 19/0075* (2013.01); *B65B 3/04* (2013.01);
(Continued)

(58) Field of Classification Search
CPC ....... B65B 3/04; B65B 7/2821; B65B 7/2828; B65B 55/027; B25J 19/0075; B25J 21/005; B01L 1/02
(Continued)

(56) References Cited

U.S. PATENT DOCUMENTS

| 2012/0031042 A1* | 2/2012 | Zambaux | .................. B65B 3/04 |
| | | | 53/167 |
| 2015/0107190 A1* | 4/2015 | Zambaux | .............. B65B 55/027 |
| | | | 53/287 |

(Continued)

FOREIGN PATENT DOCUMENTS

| DE | 102015011511 A1 * | 3/2017 | .......... B25J 19/0075 |
| DE | 102017216366 A1 | 3/2019 | |

(Continued)

OTHER PUBLICATIONS

INPI Rapport de Recherche Preliminaire for Patent Application No. FR 1904444, Dec. 10, 2019, 2 pp.

*Primary Examiner* — Stephen F. Gerrity
(74) *Attorney, Agent, or Firm* — Soquel Group LLC

(57) ABSTRACT

A disposable isolator including a bottom, a flexible peripheral wall defining a clean and sterile inner volume, a first pair of joining parts forming a first tight junction at the bottom, this first pair including an inner part placed inside the inner volume and suitable for positioning containers, and an outer part placed outside the inner volume and suitable for cooperating by shape matching with a positioning cavity provided on a support table, and a second pair of joining parts forming a second tight junction at the peripheral wall and including an outer part suitable for being connected to a robot, and an inner part suitable for being connected to a manipulating tool, the first and second pairs being designed so that the robot applies the manipulating tool on the containers positioned on the support table.

13 Claims, 4 Drawing Sheets

(51) Int. Cl.
  *B65B 7/28*    (2006.01)
  *B65B 55/02*   (2006.01)
  *B01L 1/02*    (2006.01)
  *B25J 19/00*   (2006.01)

(52) U.S. Cl.
  CPC .......... *B65B 7/2821* (2013.01); *B65B 55/027* (2013.01); *B65B 7/2828* (2013.01)

(58) Field of Classification Search
  USPC ................................ 53/281; 312/1; 422/500
  See application file for complete search history.

(56) References Cited

U.S. PATENT DOCUMENTS

2019/0224859 A1*  7/2019  Hashimoto et al. ...... B01L 1/02
2021/0275709 A1*  9/2021  Landes et al. ......... B25J 21/005

FOREIGN PATENT DOCUMENTS

| EP | 1905553 A1 * | 4/2008 | ............... B25J 21/00 |
| FR | 2366918 A1 * | 5/1978 | ................ B01L 1/02 |
| FR | 2861619 A1 | 5/2005 | |
| JP | 03046599 A * | 2/1991 | |
| WO | 2010100234 A1 | 9/2010 | |
| WO | 2018030331 A1 | 2/2018 | |

\* cited by examiner

DISPOSABLE ISOLATOR AND PRODUCT CONDITIONING INSTALLATION COMPRISING SUCH A DISPOSABLE ISOLATOR

CROSS-REFERENCE TO RELATED APPLICATION

This application claims priority of French Patent Application No. 19 04444, filed on Apr. 26, 2019.

FIELD OF THE INVENTION

The present invention relates to a disposable isolator and a product conditioning installation comprising such a disposable isolator.

BACKGROUND OF THE INVENTION

In the field of conditioning installations for pharmaceutical products, the use of handling enclosures is common. Such an enclosure defines a clean and sterile internal environment and comprises materials or equipment items placed inside the enclosure, all allowing a user to perform one or several manipulations from the outside, i.e., without being in direct contact with the materials or equipment items that are manipulated. Such an enclosure makes it possible to perform the manipulation(s) with the equipment items and/or the materials isolated from the outside environment, the enclosure being particularly suitable for manipulating hazardous and/or toxic products. The enclosures thus allow a person skilled in the art to manipulate the equipment items and the materials positioned inside the enclosures, in particular under an inert atmosphere, for example to manipulate products having to stay clean and aseptic all throughout the production and/or the manipulation(s).

It is crucial to keep the enclosure, as well as the equipment items and the materials located inside the enclosure, in clean and sterile condition. This involves regularly cleaning, or even decontaminating, the enclosure and all of the equipment items and materials located therein, and preventing the intrusion of unwanted elements, both particulate and biological.

Alternatively, a disposable isolator, including an enclosure usable temporarily, makes it possible to regularly change all of the equipment items and materials necessary for the manipulation(s) in a minimum amount of time. The disposable isolator and at least some of the equipment items and materials located therein, which are initially sterile and qualified to perform the manipulations requiring a decontaminated environment, are thrown away after use. Such a disposable isolator has the advantage of not necessarily having to be subject to a cleaning step and/or recalibration and validation steps, these steps indeed being time-consuming in the case of a permanent isolator and potentially slowing down production. Such a disposable isolator is particularly suitable for producing specific lots, for example with one or several products dedicated to a specific pathology, in order to avoid cross-contamination between successive lots.

WO-2010/100234-A1 describes one such disposable isolator, which includes a support zone and at least one filling means cooperating with the support zone in order to position at least one container substantially across from the filling zone. The support zone is integrated into the bottom wall of the isolator and a tool of the filling means is integrated into a flexible peripheral wall of the isolator, which causes design constraints of the isolator and increases the cost thereof, since it is necessary to adapt the isolator to the expected precise manipulations.

SUMMARY OF THE DESCRIPTION

The invention more particularly aims to address these problems, by proposing a new disposable isolator that is more practical.

To that end, the invention relates to a disposable isolator, including:
an enclosure including a bottom and a flexible peripheral wall, which define a clean and sterile inner volume therebetween,
a first pair of joining parts, the first pair including:
an inner part, placed inside the inner volume and suitable for positioning one or several containers, and
an outer part, placed outside the inner volume and suitable for cooperating by shape matching with a positioning cavity provided on a support table,
the inner part and the outer part of the first pair being placed on either side of the bottom and being secured to one another permanently, so as to compress the bottom between the inner part and the outer part of the first pair and to form a first tight junction, and
a second pair of joining parts, separate from the first pair, the second pair including:
an inner part, placed inside the inner volume and suitable for being connected to a manipulating tool,
an outer part, placed outside the inner volume and suitable for being connected to a robot,
the inner part and the outer part of the second pair being placed on either side of the peripheral wall and being secured to one another permanently, so as to compress the peripheral wall between the inner part and the outer part of the second pair and to form a second tight junction,
wherein the first pair and the second pair are designed so that the robot applies the manipulating tool, connected to the robot by the second pair, on the or each container positioned on the support table by the first pair.

The disposable isolator forms an enclosure, the inner volume of which is clean and sterile, qualified for the manipulation of products that are toxic for the operator and/or for the environment, in particular subject to a regulation and/or an approval by the competent authorities, such as pharmaceutical compounds, hazardous biological compounds, neoplastic or antiviral drugs, etc. The disposable isolator includes several pairs of joining parts that allow a fast and secure installation of the isolator in a production chain, so as to guarantee precise positioning of the equipment items and the materials, in particular of one or several containers to be filled and the filling material of the container (s), to ensure the proper working of the production chain.

Owing to the invention, the tedious steps of cleaning, sterilization, recalibration and validation between productions of different lots require less time, since the disposable isolator is already clean, qualified, sterilized and ready to use before its use, then the disposable isolator is cleared away and destroyed immediately after use. Time is therefore saved, which positively affects the productivity of an installation for conditioning products equipped with such a disposable isolator.

The disposable isolator is usable in an automated production chain, involving one or several robots outside the isolator. This or these robots can, for example, but nonlimitingly, be provided for filling and plugging steps of containers to be filled inside the enclosure of the disposable isolator. The isolator may easily be connected to its outside environment, in particular to the devices upstream and downstream from the isolator and to each robot involved in the manipulation of the products and the equipment items positioned inside the enclosure, while being able to ensure the precise positioning of the containers to be filled in the enclosure relative to the robots responsible for filling and plugging.

The first pair of joining parts makes it possible to precisely position the container(s) to be filled, such as vials, syringes or bottles, in a positioning cavity in a support table located outside the disposable isolator. The support table is intended to serve as a support for the disposable isolator. Exact positioning of the container(s) is especially necessary in the case of automated operations, particularly performed by one or several robots. Each second pair of joining parts serves as an interface between a manipulating tool, located inside the enclosure, and the robot, this robot optionally including an articulated arm. Each second pair of joining parts is preferably quick to assemble during the assembly of the isolator within the production line and quick to disassemble at the end of the use of the disposable isolator.

Each pair of joining parts thus makes it possible to connect an equipment item located inside the enclosure to the inner part of each pair and to connect a component of the production line located outside the enclosure to the outer part of each pair, while ensuring the tightness at the joining interface between the inner part and the outer part of each pair of joining parts. The practicality and the modularity of the isolator according to the invention are thus considerable.

The disposable isolator thus makes it possible to perform different preparation and conditioning manipulations, such as filling and plugging by screwing and/or crimping, automatically, with high precision and reliable sealing, thus allowing a high level of biological and particulate safety of the products with respect to the outside of the disposable isolator.

The flexible wall(s) of the disposable isolator limit the bulk during the storage of the unused disposable isolators and during the disposal of the disposable isolator after use thereof.

According to advantageous, but optional features of the invention:

The disposable isolator comprises several second pairs, the inner parts of the second pairs being associated with respective manipulating tools and the outer parts of the second pairs being associated with respective robots.

The manipulating tool is suitable for filling the or each container.

The manipulating tool is suitable for placing a stopper on the or each container.

The manipulating tool is also suitable for screwing or clipping a stopper on the or each container.

The robot includes an articulated arm to which the outer part of the second pair is suitable for being connected.

The inner part of the second pair and the manipulating tool are connected by a pin, and the outer part of the second pair and the robot are connected by another pin.

The inner part and the outer part of the first pair are secured to one another permanently by elements passing through the bottom, and the inner part and the outer part of the second pair are secured to one another permanently by other elements passing through the peripheral wall.

The disposable isolator further comprises an adapter, which is securely attached on the inner part of the first pair and which positions the or each container thereon.

The invention also relates to an installation for conditioning products, in particular pharmaceutical products, including:

a disposable isolator as defined above, a support table provided with a positioning cavity, the positioning cavity being suitable for cooperating by shape matching with the outer part of the first pair, and at least one robot, suitable for being connected with the outer part of the second pair.

According to additional advantageous features of this installation:

The installation further includes at least one pouch of products, which is located outside the disposable isolator and from which at least one product transfer tubing extends, the at least one product transfer tubing being connected to the disposable isolator via at least one tight port.

The installation further includes an upstream enclosure, which is positioned upstream from the disposable isolator and which is connected to the disposable isolator via at least one tight port.

The installation further includes a downstream enclosure, which is positioned downstream from the disposable isolator and which is connected to the disposable isolator via at least one tight port.

BRIEF DESCRIPTION OF THE DRAWINGS

The invention will be better understood, and other advantages thereof will appear more clearly, in light of the following description of one embodiment of the invention according to its principle, provided solely as an example and done in reference to the appended drawings, in which.

DETAILED DESCRIPTION

Figure 1:
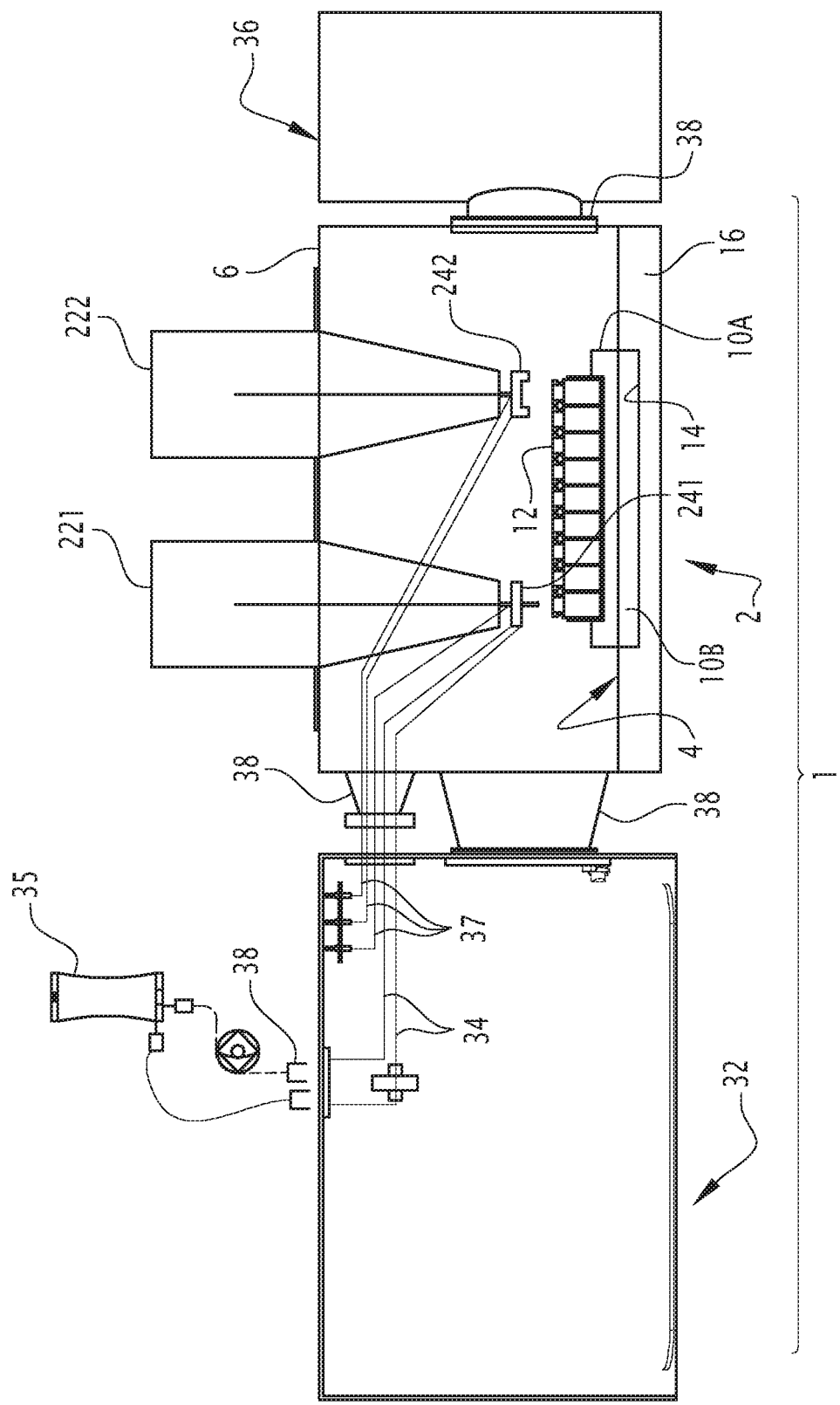
FIG. 1 is a schematic illustration of an installation for conditioning products comprising a disposable isolator according to the invention.

FIG. 1 shows an installation 1 for conditioning products including a disposable isolator 2 and a support table 16 for this isolator, as well as enclosures 32 and 36 respectively positioned upstream and downstream from isolator 2.

Upstream enclosure 32 and downstream enclosure 36 are connected to isolator 2 by means of tight ports 38, in particular of the RTP (Rapid Transfer Port) type, for transferring equipment items or materials from upstream enclosure 32 toward isolator 2, or vice versa, and from downstream enclosure 36 toward isolator 2, or vice versa. Tight ports 38 are preferably cylindrical and may have different diameters. In a variant, input and output means other than tight ports 38 may be considered for introducing or removing the equipment items and the materials in disposable isolator 2: in all cases, the input and output means have appropriate dimensions for this use and allow a transfer without breaking confinement and asepsis. Advantageously, these input and output means, such as tight ports 38, are secure.

The product(s) intended to be manipulated inside isolator 2, such as fluids or substantially liquid substances, are stored in one or several pouches 35 of installation 1, which are located outside isolator 2. Installation 1 also includes at least one tubing 34 that extends from the pouch or pouches 35 and that makes it possible to transfer the product(s) therefrom to the inside of isolator 2, via one or several tight ports 38. Installation 1 may also include at least one tubing 37 making it possible to convey a fluid from the outside to the inside of isolator 2, this fluid being intended to be used in isolator 2 for various purposes. As an example, tubing 37 thus makes it possible to perform an evacuation, for reasons that will appear later. In a variant, tubing 37 may convey compressed air, nitrogen, etc.

In the embodiment visible in FIG. 1, installation 1 further includes a first robot 221, responsible for a first manipulation, and a second robot 222, responsible for a second manipulation, different from the first manipulation. Robots 221 and 222 are connected to isolator 2, while being located outside isolator 2. Of course, as will be understood hereinafter, neither the number of robots, nor the nature of the manipulations done by the robot(s), are limiting with respect to the invention. Furthermore, the remainder of the text addresses a general case where no distinction is made between robot 221 and robot 222, each robot then bearing the same reference 22.

Figure 2:
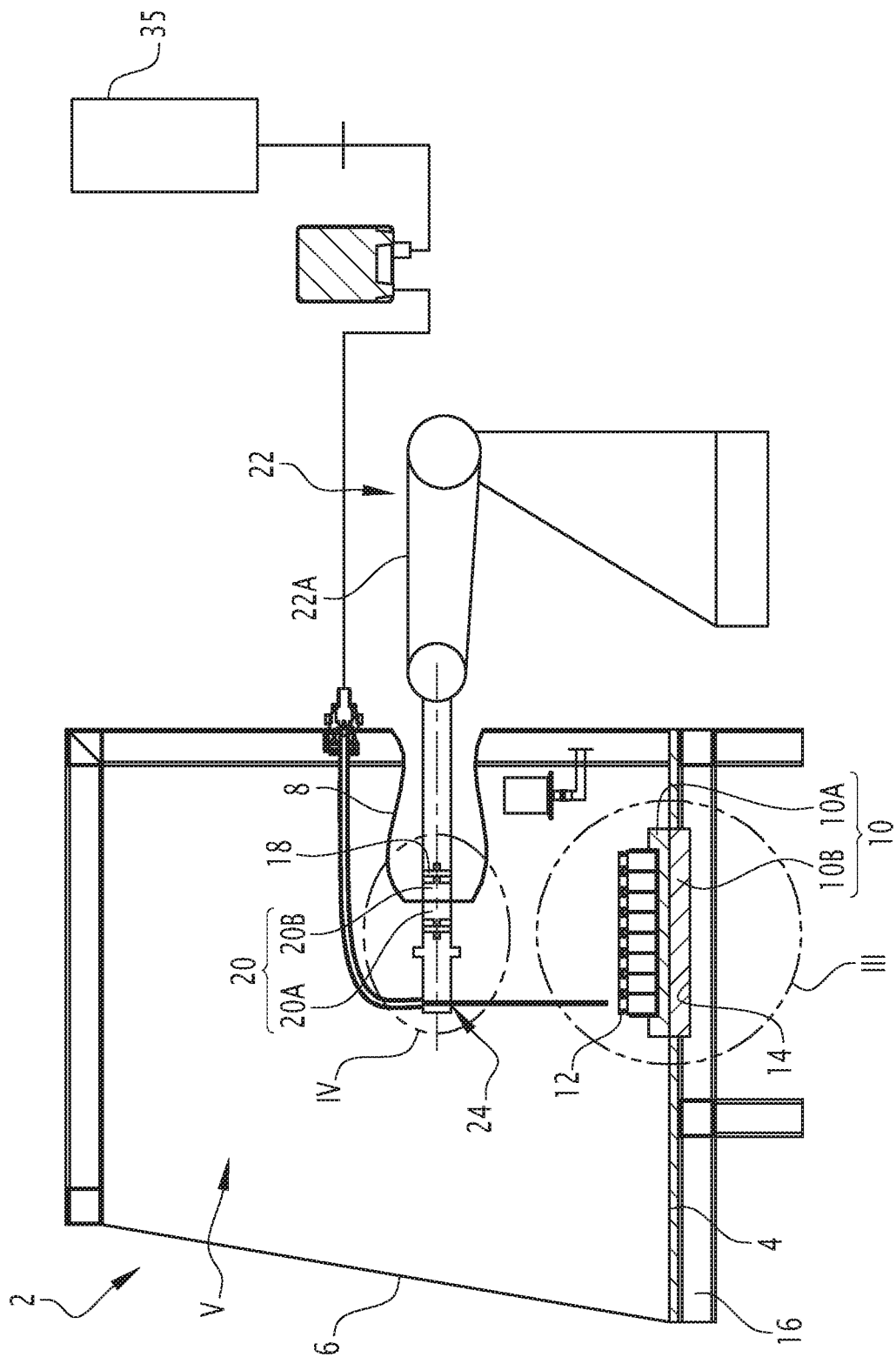
FIG. 2 is a schematic illustration of the disposable isolator of FIG. 1, associated with a robot and a support table that are located outside the disposable isolator.

As clearly shown in FIG. 2, isolator 2 includes a bottom 4 and a peripheral wall 6 capping bottom 4. Bottom 4 and wall 6 together form an enclosure that defines a closed inner volume V of isolator 2. During use, volume V is clean and sterile. Isolator 2 thus has an inner environment which is clean from a particulate perspective and which is sterile from a bacteriological perspective. In practice, the cleanliness with respect to particles from the outside is typically provided by an appropriate filtration and air supply, which relate to technologies known in themselves and which are not described here in more detail. The sterility is initially provided by an ad hoc treatment of isolator 2, which is known in itself and which for example consists of gamma radiation.

The enclosure of disposable isolator 2 is made up of one or several flexible materials, preferably made up of at least one plastic material, for example PE (polyethylene). In particular, bottom 4 and peripheral wall 6 are made up of one or several materials, which may be identical, wall 6 and bottom 4 then being able to be made in a single piece, or different pieces. In all cases, bottom 4 and wall 6 may be welded to one another.

Disposable isolator 2 is "disposable" in that it is intended for a single use, i.e., it is used only once before being destroyed, for example by incineration. In a variant, disposable isolator 2 may be used a limited number of times, before being removed and destroyed.

Wall 6 is flexible in that at least part of this wall is flexible enough to be able to be bent by an operator without requiring the operator to supply an excessive effort to bend wall 6. Inner volume V defined by wall 6 and bottom 4 may thus easily be reduced when isolator 2 is changed. Such a flexibility of all or part of wall 6 advantageously makes it possible to reduce the bulk of unused isolator 2 when it is stored or to limit the bulk of isolator 2 when it is removed and destroyed after use. In other words, the flexibility of wall 6 may allow more compact volume of isolator 2 before and after use.

Isolator 2 may include rigid parts that serve to stabilize the enclosure, in particular wall 6, during the use of the isolator. In a variant, the enclosure of isolator 2 may be attached to or hung from a framework or a rigid structure.

Bottom 4 is in turn provided to be spread on support table 16 of installation 1. Support table 16 is to that end provided with a cavity 14 that is, for example, hollowed in a substantially horizontal work surface defined by the rest of support table 16.

Figure 3:
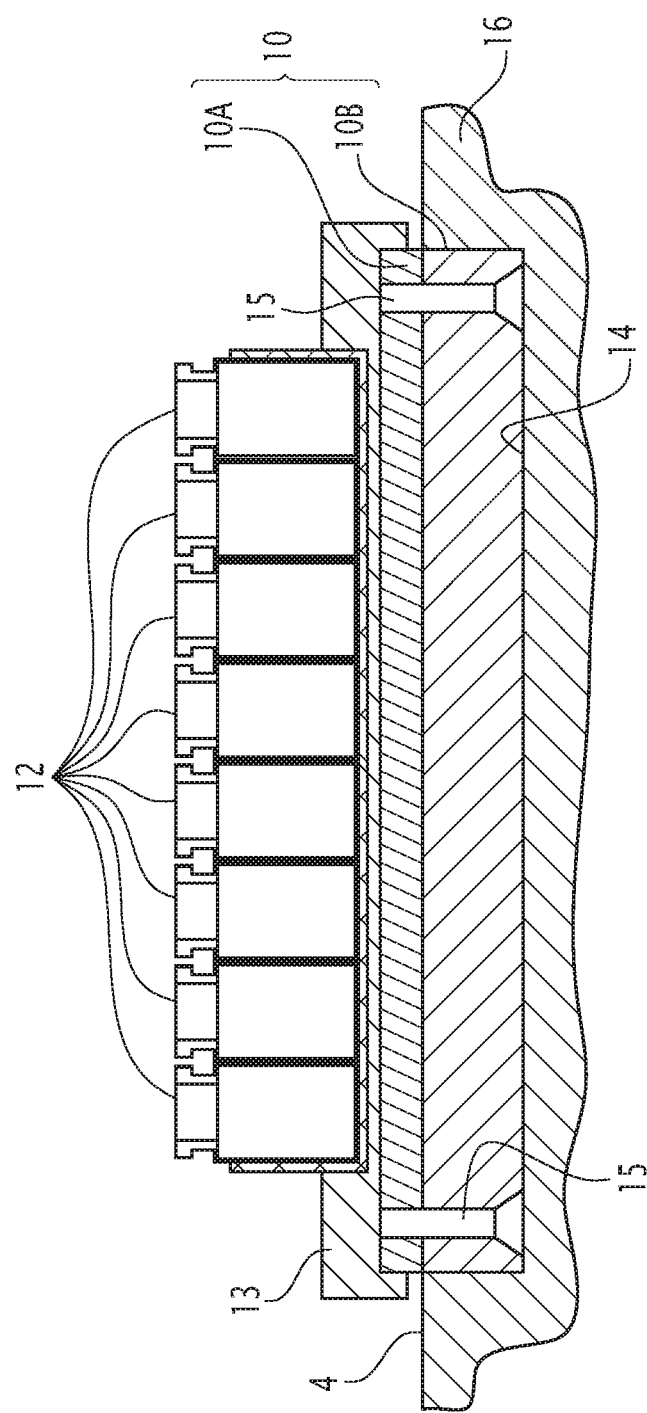
FIG. 3 is a detailed view of zone III of FIG. 2.

Isolator 2 also includes a first pair 10 of joining parts 10A and 10B. As clearly shown in FIG. 3, first pair 10 includes an inner part 10A, suitable for positioning one or several containers 12 inside volume V, on the one hand, and an outer part 10B, suitable for cooperating by shape matching with cavity 14, on the other hand.

Inner part 10A is placed inside volume V, while outer part 10B is placed outside volume V, such that parts 10A and 10B are located on either side of bottom 4. Parts 10A and 10B compress bottom 4 between them and thus form a tight junction. In other words, the junction formed by parts 10A and 10B does not allow liquid, gas, dust, moisture or pollution of any nature to pass. The material, preferably flexible, of bottom 4 thus compressed then serves as a sealing gasket. Of course, an additional sealing liner may optionally be attached between parts 10A and 10B.

Parts 10A and 10B are permanently secured to one another, in particular using elements 15 passing through bottom 4. These elements 15 may for example be screws. In addition to being tight, the junction formed by parts 10A and 10B is fixed such that, during use, parts 10A and 10B do not move relative to one another.

During use, cavity 14 cooperates by shape matching with part 10B such that cavity 14 thus positions part 10B, and as a result, part 10A. At the same time, container(s) 12 are supported and thus positioned on part 10A, either directly, or, as in the example considered in FIG. 3, by means of an adapter 13 that forms a mechanical interface between part 10A and container or group of containers 12. Adapter 13 is positioned and fastened on part 10A by ad hoc fastening elements, not shown in the figures, such as screws, quarter turns, centering studs, etc. Adapter 13 allows easy adaptation of part 10A to the shape of container or group of containers 12 that part 10A positions inside volume V. It will therefore be understood that adapter 13 is an interchangeable part as a function of the format and type of container(s) 12.

Isolator 2 also includes a second pair 20 of joining parts 20A and 20B. Pair 20 of joining parts is separate from pair 10 of joining parts. As clearly shown in FIG. 4, second pair 20 of joining parts includes, on the one hand, an inner part 20A, suitable for being connected to a manipulating tool 24 located inside volume V, and on the other hand, an outer part 20B, suitable for being connected to robot 22 of installation 1.

Part 20A is placed inside sterile volume V while part 20B is placed outside sterile volume V, such that parts 20A and 20B are placed on either side of wall 6, at a necessarily flexible part thereof. Joining parts 20A and 20B compress wall 6 between them and thus form a tight junction. In other words, the junction formed by second pair 20 of joining parts is similar in principle to the junction formed by parts 10A and 10B of first pair 10 of joining parts. None of these junctions allow liquid, gas, dust, moisture or pollution of any nature to pass. The flexible material of wall 6 thus compressed thus serves as sealing gasket. Of course, an additional sealing liner may optionally be attached between parts 20A and 20B.

Parts 20A and 20B are permanently secured to one another using elements 17 passing through wall 6. Elements 17 may, for example, be screws. In addition to being tight, the junction formed by each second pair 20 is fixed, such that parts 20A and 20B do not move relative to one another. In practice, elements 17 may have a different shape from that of elements 15 securing the parts of first pair 10 through bottom 4. This difference in shape may, for example, correspond to a different size of elements 15 and 17.

In the example illustrated in the figures, the connection between inner part 20A and manipulation tool 24, and the connection between outer part 20B and robot 22, are each done by means of at least one pin 18. Thus, the assembly of inner part 20A on manipulation tool 24 and the assembly of outer part 20B on robot 22 do not involve an assembly tool. The assembly is thus made easier and fast to perform, with the understanding that in practice, multiple embodiments may be considered to allow such a quick and easy assembly. Furthermore, in a variant that is not shown, fastening members requiring tools may also be considered.

Figure 4:
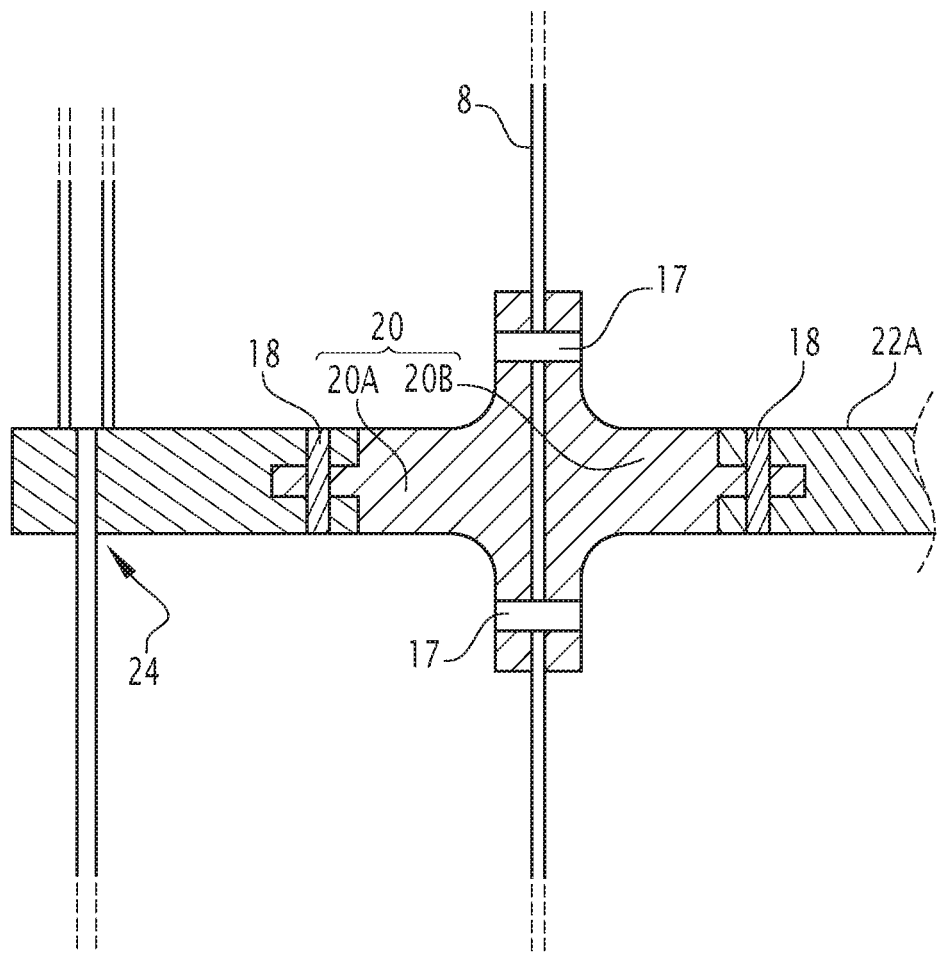
FIG. 4 is a detailed view of zone IV of FIG. 2.

As shown in FIGS. 2 and 4, robot 22 may include an articulated arm 22A. In this case, it is articulated arm 22A that is connected to outer part 20B, in particular by means of pin(s) 18. Additionally, wall 6 then advantageously forms a sleeve 8, which forms a necessarily flexible part of wall 6 and inside of which articulated arm 22A is arranged and may move there without significant constraint in its movements. Sleeve 8 may also be provided in a single piece with the rest of wall 6, or be attached to the rest of wall 6 interchangeably.

Robot 22 is for example a multiaxial robot.

The junction formed by parts 20A and 20B allow robot 22 to perform, from the outside of the enclosure, one or several manipulations inside the volume V by means of tool 24. In other words, robot 22, in particular its articulated arm 22A, makes it possible to move, by means of second pair 20, tool 24 relative to support table 16 to perform the manipulation. It will be noted that the term "manipulation" used here must be understood broadly, as covering all types of operations performed by tool 24 on containers 12, some of which are described hereinafter as examples, but which, more generally, are related to the preparation and conditioning of containers 12 and the product that they contain. In all cases, since the manipulation operation(s) are automated, isolator 2 must allow reliable and precise positioning between each container 12 and tool 24. This positioning is in large part provided by pairs 10 and 20, since robot 22 applies tool 24, connected to robot 22 by joining parts 20A and 20B, on each of containers 12 that are positioned on support table 16, by joining parts 10A and 10B and, if applicable, adapter 13.

Isolator 2 may include several pairs 20, part 20A of each pair 20 then being connected to a tool 24 inside volume V, while part 20B of each pair 20 is then connected to a robot 22 outside volume V, several tools 24 and several robots 22 then being provided as shown in FIG. 1. In the example of FIG. 1, a first manipulating tool 24, called "filling tool 241" hereinafter, is suitable for filling container(s) 12 with one or several products, in particular one or several pharmaceutical products. Thus, filling tool 241 may in particular include a needle, a syringe, or any other filling means suitable for transferring a product, circulating in the or one of tubings 34, from the or one of pouches 35, to the inside of the or each container 12 inside volume V. At least part of filling tool 241 may be thrown away with isolator 2 when the latter is disposed of at the end of use. Pair 20 associated with filling tool 241 ensures the positioning of filling tool 241 with respect to the opening of the or each container 12 in order to perform the filling of the latter, the first robot 221 being connected to pair 20. Also, in the example of FIG. 1, a second manipulating tool 24, called "plugging tool 242" hereinafter, is provided and suitable for placing and, if applicable, screwing or clipping a stopper on each container 12, for example, by using the vacuum created by the or one of tubings 37. The same degrees of freedom, or different degrees of freedom, are granted to second robot 222 connected to plugging tool 242 by means of a pair 20 different from the pair that connects filling tool 241 to robot 221. The positioning of plugging tool 242 relative to each container 12 follows a logic similar to that of the positioning of filling tool 241.

In all cases, once the enclosure of isolator 2 is assembled to parts 10A and 10B of first pair 10 and parts 20A and 20B of second pair(s) 20, as well as, if applicable, tight ports 38, the inside of the enclosure is sterilized and kept clean as mentioned above, the sterilization being applied, if applicable, to adapter 13 and to manipulating tool(s) 24. Isolator 2 is next associated with enclosures 32 and 36 within installation 1, as described above. It will be understood that upstream enclosure 32 may be used to perform preparatory operations therein for the manipulations done in isolator 2, in particular by robot(s) 22. Downstream enclosure 36 may in turn be used to store containers 12 therein having undergone the manipulations done in isolator 2 and/or be used to perform subsequent additional operations on containers 12.

In a variant, isolator 2 includes several first pairs 10 of joining parts 10A and 10B.

Optionally, the enclosure of isolator 2 may be associated with additional equipment items such as a scale, in particular an analysis scale, and/or a vibrating bowl.

Also optionally, the enclosure of isolator 2 includes, on its front face, a pair of gloves, which may be integrated or interchangeable, to allow an operator to manipulate the equipment items and the materials inside volume V by hand. These gloves thus make it possible to place the various tools necessary for a specific production and/or the reusable accessories, such as the vibrating bowl or the scale mentioned above.

Any feature of one of the embodiments or variants disclosed above can be implemented in the other disclosed embodiments and variants.

The invention claimed is:
1. A disposable isolator, comprising:
 an enclosure comprising a bottom and a flexible peripheral wall, which define a clean and sterile inner volume therebetween;
 a first pair of joining parts, comprising:
  an inner first part, placed inside the inner volume and suitable for positioning one or several containers; and
  an outer first part, placed outside the inner volume and suitable for cooperating by shape matching with a positioning cavity provided on a support table, the inner and outer first parts being placed on either side of said bottom and being secured to one another permanently, so as to compress said bottom between the inner and outer first parts and to form a first tight junction; and
 a second pair of joining parts, separate from said first pair of joining parts, comprising:
  an inner second part, placed inside the inner volume and suitable for being connected to a manipulating tool; and
  an outer second part, placed outside the inner volume and suitable for being connected to a robot, the inner and outer second parts being placed on either side of said peripheral wall and being secured to one another permanently, so as to compress said peripheral wall between the inner and outer second parts and to form a second tight junction, wherein said first and second pairs of joining parts are designed so that the robot applies the manipulating tool, connected to the robot by said second pair of joining parts, on the or each container positioned on the support table by said first pair of joining parts.

2. The disposable isolator according to claim 1, further comprising several second pairs of joining parts, the inner second parts being associated with respective manipulating tools and the outer second parts being associated with respective robots.

3. The disposable isolator according to claim 1, wherein the manipulating tool is suitable for filling the or each container.

4. The disposable isolator according to claim 1, wherein the manipulating tool is suitable for placing a stopper on the or each container.

5. The disposable isolator according to claim 4, wherein the manipulating tool is also suitable for screwing or clipping a stopper on the or each container.

6. The disposable isolator according to claim 1, wherein the robot includes an articulated arm to which said outer second part is suitable for being connected.

7. The disposable isolator according to claim 1, wherein said inner second part and the manipulating tool are connected by a pin, and wherein said outer second part and the robot are connected by another pin.

8. The disposable isolator according to claim 1, wherein said inner and outer first parts are secured to one another permanently by elements passing through said bottom, and wherein said inner and outer second parts are secured to one another permanently by other elements passing through said peripheral wall.

9. The disposable isolator according to claim 1, further comprising an adapter, which is securely attached on said inner first part and which positions the or each container thereon.

10. An installation for conditioning products, comprising:
a disposable isolator according to claim 1;
a support table provided with a positioning cavity, the positioning cavity being suitable for cooperating by shape matching with the outer first part of said disposable isolator; and
at least one robot, suitable for being connected with the outer second part of said disposable isolator.

11. The installation according to claim 10, further comprising at least one pouch of products located outside said disposable isolator and from which at least one product transfer tubing extends, the at least one product transfer tubing being connected to said disposable isolator via at least one tight port.

12. The installation according to claim 10, further comprising an upstream enclosure positioned upstream from said disposable isolator and connected to said disposable isolator via at least one tight port.

13. The installation according to claim 10, further comprising a downstream enclosure positioned downstream from said disposable isolator connected to said disposable isolator via at least one tight port.

* * * * *